United States Patent [19]

Collins, Jr.

[11] 4,226,288

[45] Oct. 7, 1980

[54] SIDE HOLE DRILLING IN BOREHOLES

[75] Inventor: Earl R. Collins, Jr., La Canada, Calif.

[73] Assignee: California Institute of Technology, Pasadena, Calif.

[21] Appl. No.: 903,240

[22] Filed: May 5, 1978

[51] Int. Cl.² ............................................ E21D 10/00
[52] U.S. Cl. ...................................... 175/62; 64/2 R; 64/3; 175/320
[58] Field of Search ........................ 175/61, 62, 73, 77, 175/78, 171, 52, 320; 166/50, 77; 64/2 R, 3; 52/108

[56] References Cited

U.S. PATENT DOCUMENTS

| | | | |
|---|---|---|---|
| 1,367,042 | 2/1921 | Granville | 64/2 R X |
| 2,344,277 | 3/1944 | Zublin | 175/61 |
| 2,574,657 | 11/1951 | Pierce | 52/108 X |
| 2,696,264 | 12/1954 | Colmerauer et al. | 166/50 X |
| 3,805,462 | 4/1974 | Caperton | 52/108 |
| 4,062,412 | 12/1977 | McIlvanie | 175/57 |

FOREIGN PATENT DOCUMENTS

| | | | |
|---|---|---|---|
| 871411 | 5/1971 | Canada | 52/108 |
| 271061 | 3/1914 | Fed. Rep. of Germany | 52/108 |
| 1189492 | 3/1965 | Fed. Rep. of Germany | 175/57 |

*Primary Examiner*—James A. Leppink
*Attorney, Agent, or Firm*—Freilich, Hornbaker, Wasserman, Rosen & Fernandez

[57] ABSTRACT

Apparatus for use in a borehole or other restricted space to bore a side hole into the strata surrounding the borehole, including a flexible shaft with a drill at its end, and two trains of sheathing members that can be progressively locked together into a rigid structure around the flexible shaft as it is directed sidewardly into the strata.

5 Claims, 10 Drawing Figures

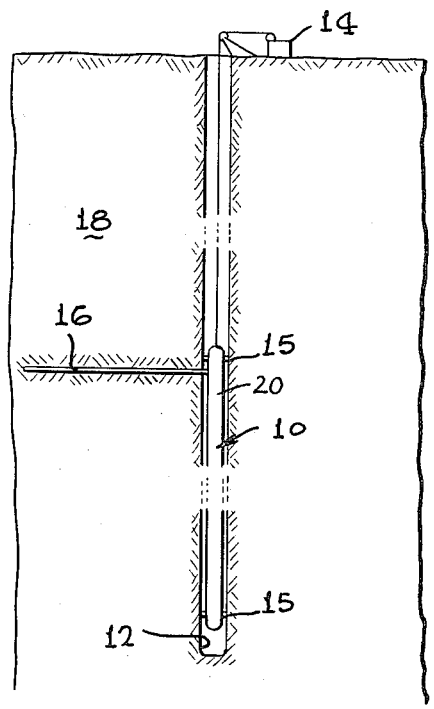
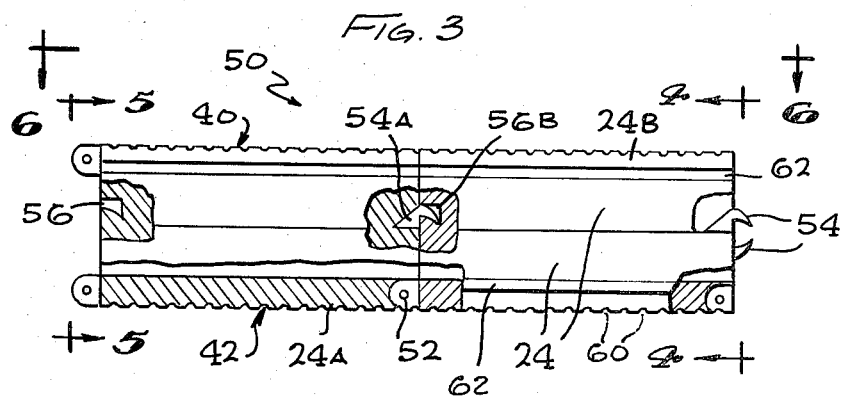
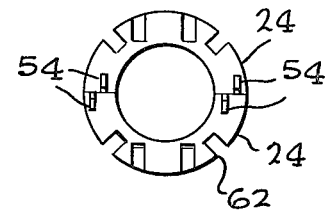
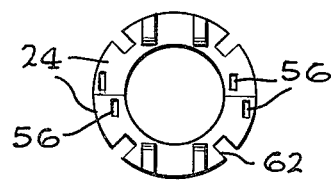
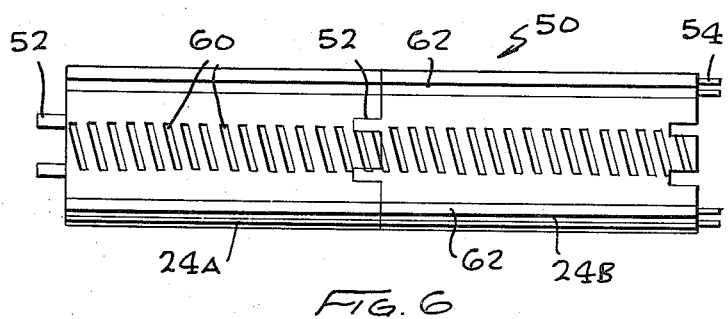
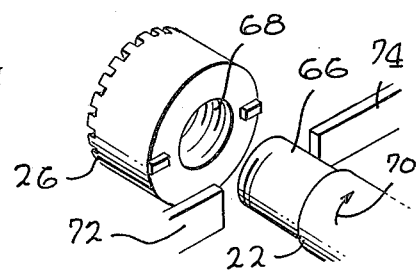

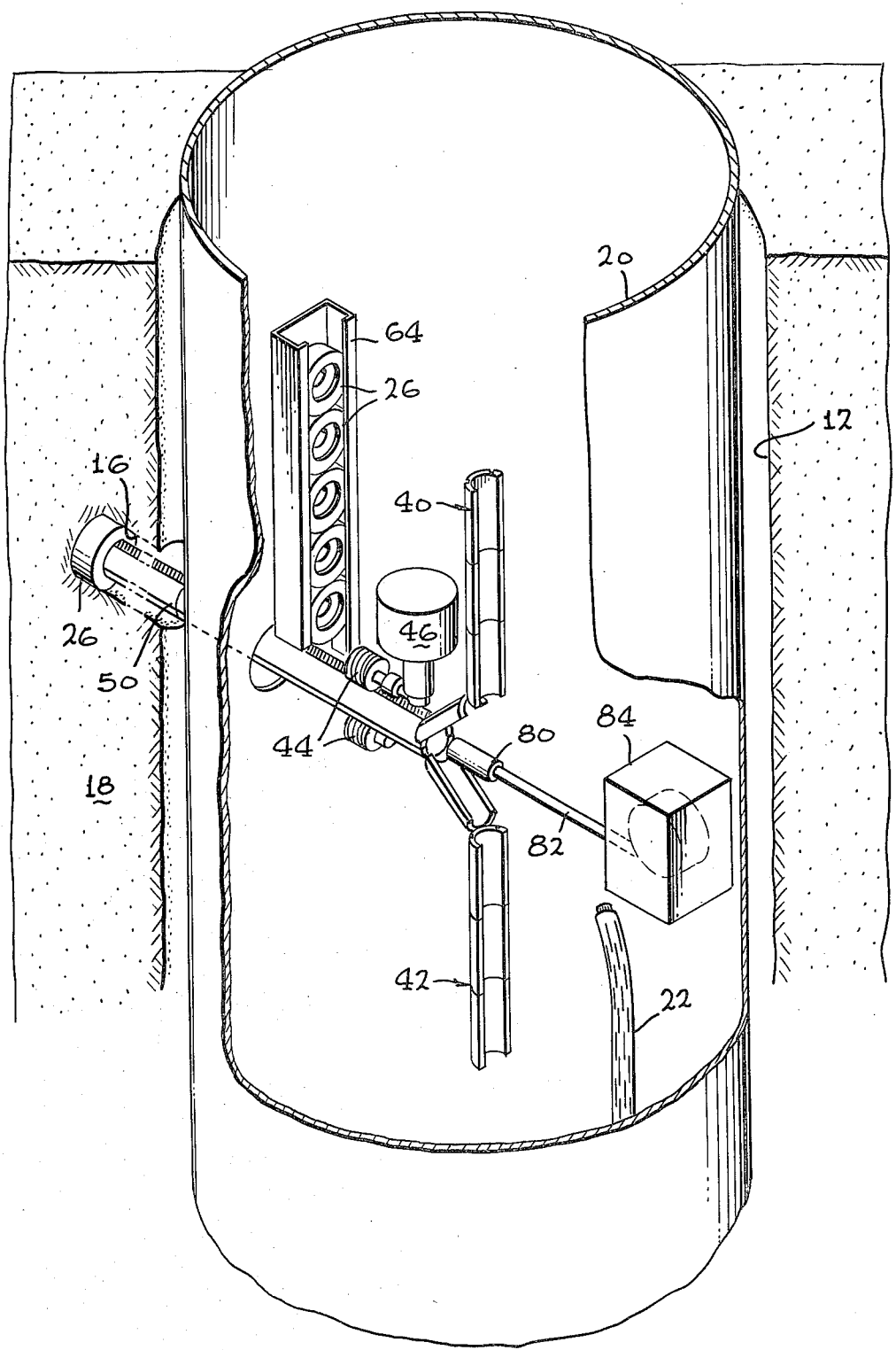

SIDE HOLE DRILLING IN BOREHOLES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Geological assessments of the strata surrounding a borehole, can be obtained by a variety of techniques that involve lowering a device to a predetermined depth within the borehole and extending a boring tool from the device into the side wall of the borehole and into the strata surrounding it, to obtain a sample of the strata or to install one or more probes therein. Current industry practice uses devices such as samplers which are driven into the side wall of the borehole by explosive charges. However, these techniques permit penetration to only a small distance such as several inches from the borehole. The region immediately around the borehole is not necessarily representative of the surrounding strata, since the borehole walls are impregnated with drilling mud and are severely disturbed by the high bit loads of the borehole drill. There are advantages in obtaining access to strata formations a plurality of borehole diameters away from the borehole, such as a few meters away, where there is minimal contamination by the drilling mud and minimal terrain distortions produced by the borehole drilling.

A severe constraint on mechanical drilling in a lateral direction from the borehole, is imposed by the small dimensions of typical boreholes, which are generally not more than six inches in diameter. The boring apparatus must be contained within the confines of a housing which can fit into such a small borehole, and therefore requires a folding or collapsing device of relatively long reach for making long lateral penetrations. Apparatus that permitted such penetrations to be made for the installation of probes or the obtaining of core samples from the strata surrounding the borehole, would be of considerable value in the making of geological assessments, such as permitting more accurate determinations of oil extraction potential, geothermal energy extraction, and the like.

SUMMARY OF THE INVENTION

In accordance with one embodiment of the present invention, a side hole boring mechanism is provided which enables the effective formation of long side holes from a narrow borehole. The mechanism includes a pair of trains of sheathing members for enclosing a flexible boring tool such as a motor driven flexible shaft. Each of the sheathing members extends only halfway around the flexible shaft or other boring tool, but the members can lock to one another to form a 360° sheathing. As the flexible shaft progreses sidewardly into the strata, the sheathing members progressively lock around the shaft of progressively greater length, that can assure that boring progresses in a substantially straight line into the strata. Each train of sheathing members can include members pivotally joined in series, so that the sheathing members can be pulled out of the side hole after it has been bored, and the sheathing members can then be rapidly stored away.

The novel feature of the invention are set forth with particularity in the appended claims. The invention will be best understood from the following description when read in conjunction with the accompanying drawings.

BRIEF DESCRIPTION OF THE DRAWINGS

FIG. 1 is a sectional view showing a boring mechanism of the present invention lying in a deep borehole.

FIG. 3 is a partial view of the boring apparatus of FIG. 2.

FIG. 4 is a taken on the line 4—4 of FIG. 3.

FIG. 5 is a view taken on the line 5—5 of FIG. 3.

FIG. 6 is a view taken on the line 6—6 of FIG. 3.

FIG. 7 is a partial perspective exploded view of the front end of the boring apparatus of FIG. 2.

FIG. 8 is a view of the apparatus of FIG. 2, shown during the insertion of an instrument into a drilled bore hole.

DESCRIPTION OF THE PREFERRED EMBODIMENTS

Figure 2:
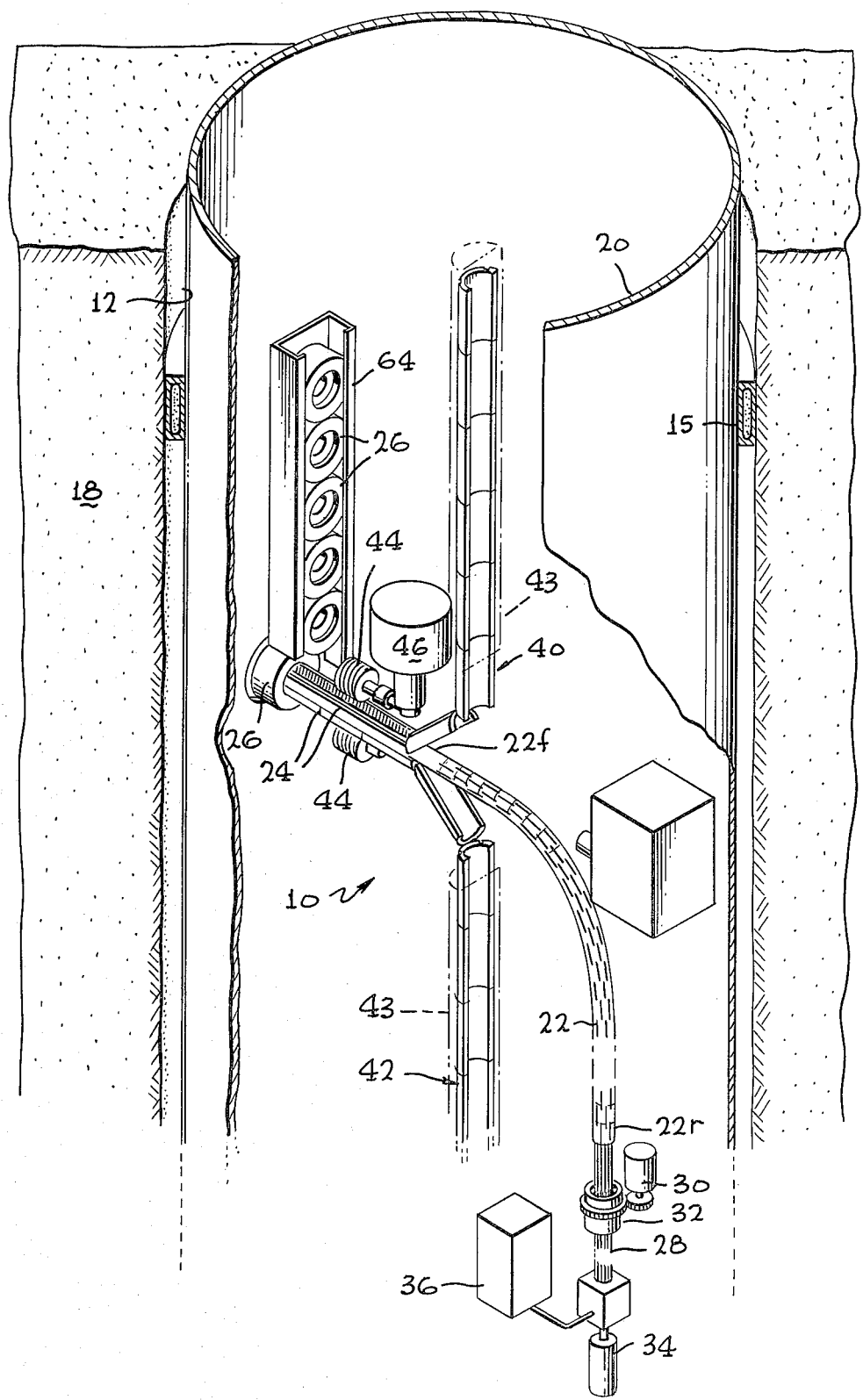
FIG. 2 is a partial perspective view of the boring mechanism of FIG. 1, showing it at the beginning of the drilling of a side hole.

FIG. 1 illustrates a boring apparatus 10 which has been lowered into a previously drilled borehole 12 by a winch 14, and maintained at a position in the borehole by inflatable packers 15. The apparatus has been utilized to bore a side hole 16 deeply into the surrounding strata 18, with the side hole having a length which is a plurality of borehole diameters. The side hole can be drilled for a number of reasons, including enabling probes to be installed for making geological assessments at a location far from the borehole 12, which is useful to avoid the mud caked walls of the borehole and the stress released region immediately about the borehole. The side hole can be bored also, to enable core samples to be obtained therefrom or to provide ventilation holes for coal mines or flow holes that permit a higher rate of oil or geothermal steam flow from the strata to the boreholes. In any case, a major obstacle to be overcome in the forming of a long side hole 16, is the provision of a boring mechanism that can drill largely perpendicular to the borehole, or laterally (e.g. within 45° of a plane perpendicular to the axis of the borehole 12) by a long distance and yet which can fit in a narrow housing 20 for passing down a borehole 12 which may have a diameter such as 6 inches. Although a hose can be utilized that emits pressured or corrosive fluid to bore a hole, boring by a rotary drill has many advantages such as minimal disturbance of the strata, and is normally the desired method. A rotating flexible shaft could be utilized by itself, except that such a shaft cannot be relied upon to drill a straight hole, but instead has a tendency to drill in a spiral around the borehole. Accordingly, a boring mechanism, preferably of the rotary drilling type, would be desirable, if it could extend relatively rigidly when advanced sidewardly into the strata surrounding the borehole, and yet could be stored so it extends largely vertically along the tall thin boring apparatus 10 which must pass down the borehole. It should be noted that the apparatus can be used in other situations where a long sidehole must be bored from a deep hole, such as to bore a hole from a mineshaft into a tunnel, and the term "borehole" herein refers to any such deep shaft or hole.

FIG. 2 illustrates a boring apparatus 10 which includes a flexible rotary drive shaft 22, most of which extends along the length of the long housing 20, but which includes a forward portion 22f that extends in a largely lateral direction to penetrate the walls of the borehole 12 and form a side hole therein. In order to rigidize the flexible shaft, sheathing members 24 are applied around the forward shaft portion. The sheathing members 24 surround the flexible shaft and hold substantially rigidly to one another. Accordingly, as the forward portion 22f of the flexible shaft and then much of the rest of the shaft is advanced out of the housing 20 and into the surrounding strata, the sheathing members 24 progressively applied to the flexible shaft form a progressively longer rigid sheathing member that causes the flexible shaft to extend in a substantially straight line. The flexible shaft 22 turns a drill bit 26 that cuts into the strata to form the side hole.

In the illustrated system, a long splined rod 28 is fixed to the rearward end at 22r of the flexible shaft to turn it. A drive motor 30 drives a gear 32 with a splined hole, that rotates the splined rod 28 to rotate the flexible shaft. The gear 32 also permits the splined rod and shaft to advance upwardly and then sidewardly into the side hole. A thrust cylinder 34 applies pressure to the rearward end of the rod to maintain force on the drive shaft to advance it, and a filter and pump apparatus 36 applies ambient fluid in the bore hole as drilling fluid through the hollow splined rod 28 and hollow flexible shaft 22 to aid in drilling and to carry away the drilled out material.

The sheathing members 24 are arranged in two trains 40, 42 that initially extend primarily vertically and are stored in guides 43, to fit into the housing 20. The two trains 40, 42 are guided by the guides 43 and worms 44, that guide them first in path portions extending towards one another, then in path portions that curve towards parallel and adjacent paths, and then along path portions that extend parallel and adjacent to one another. The sheathing members of the two trains lock together as they curve into parallel path portions. The two trains 40, 42 are initially brought together around the forward end 22f of the flexible shaft and then automatically lock together to form a rigid sheathing that completely encloses the front end of the flexible shaft. The sheathing members have rack gear teeth formed on their outside, and a pair of worms 44 engage the teeth to advance the sheathing, the worms being driven by a motor 46 to provide the thrust needed for drilling.

FIGS. 3–6 illustrate details of the sheathing 50 formed by the sheathing members 24. It can be seen that in each train of sheathing members such as train 42, the successive sheathing members of the train are pivotally joined by hinges 52. This hingable joining keeps the train of members together so they can be easily deployed around the flexible shaft and then withdrawn again. The two trains 40, 42 lock together by means of hook like locking cams 54 formed at the rear end of each sheathing members, that lock into corresponding locking recesses or slots 56 formed at the front ends of the members. The sheathing member 24A has a pair of upstanding locking cams 54A at its rearward end that project rearwardly and also towards the other train of sheathing members. Accordingly, the cam 54A of the sheathing member 24A, is closely received in a locking slot 56B of sheathing member 24B. By locking a cam of one train 42 of sheathing members, to the slots of the other train 40 of sheathing members, the two trains are locked together, and in a manner that prevents bending to a small radius, but instead permits only slight bending of the locked-together trains. The locked-together trains can be separated only by pulling them apart progressively from the rear of the trains.

It can be seen from FIG. 6, that each sheathing member 24 has a rack of gear teeth 60 that can engage the worm gears 44 of FIG. 1. In addition, the sheathing members have slots 62 extending along the length of each train of sheathing members, that are engaged by anti-rotation pins (not shown) that prevent rotation of the sheathing.

The drill bit 26 shown in FIG. 1 is only one of a series of drill bits contained in a magazine 64. A worn drill bit can be automatically removed so that it drops down into the bottom of the housing 20, and can be replaced by another drill bit. This is accomplished as shown in FIG. 7, by utilizing pipe threads 66 and 68 at the end of the flexible shaft 22 and on the inside of the drill bit 26. When the flexible shaft is rotating in the clockwise direction, as shown by arrow 70, the threaded front end 66 of the flexible shaft engages the drill bit to turn it. Such clockwise turning occurs during drilling of a side hole end withdrawal of the drill bit from the side hole. After the drill bit has been completely withdrawn, it can be removed by pulling on the flexible shaft 22 until the drill bit engages a pair of stops 72, 74. Then, the flexible shaft 22 can be rotated in a counterclockwise direction, while the stops 72, 74 prevent the drill bit 26 from rotating, so that the drill bit will be unscrewed from the drive shaft and fall off. A cradle (not shown) can be slid under the drill bit position, a next drill bit can be dropped into the cradle to hold the new drill bit in alignment with the front end of the shaft 22, and the shaft can be advanced and rotated clockwise to attach itself to the new drill bit. Where the borehole has a steel casing, a first drill bit designed for efficient steel drilling can be used to bore through the casing, and the bit can then be replaced by a bit designed for efficient bore in the strata.

FIG. 8 illustrates the boring apparatus after the side hole 16 has been completely bored and the flexible shaft 22 has been completely withdrawn from the side hole. The drill bit can be separated from the shaft by counterclockwise rotation of the shaft. In this case, the sheathing 50 has been left in the side hole to serve as a casing for protecting the probe 80 that is to be installed in the side hole. After the flexible shaft 22 has been withdrawn, the probe 80 can be inserted through the sheathing to a location along the side hole such as immediately before the drill bit 26. The sheathing 50 can then be withdrawn to leave the probe in place which is exposed to the surrounding strata. The probe 80 lies at the end of a spring steel support 82 of the type typically used for mechanic's rules, with the spring steel strip 82 originally being coiled in an instrument storage space 84 and being extendable by a motor therein (not shown).

Figure 9:
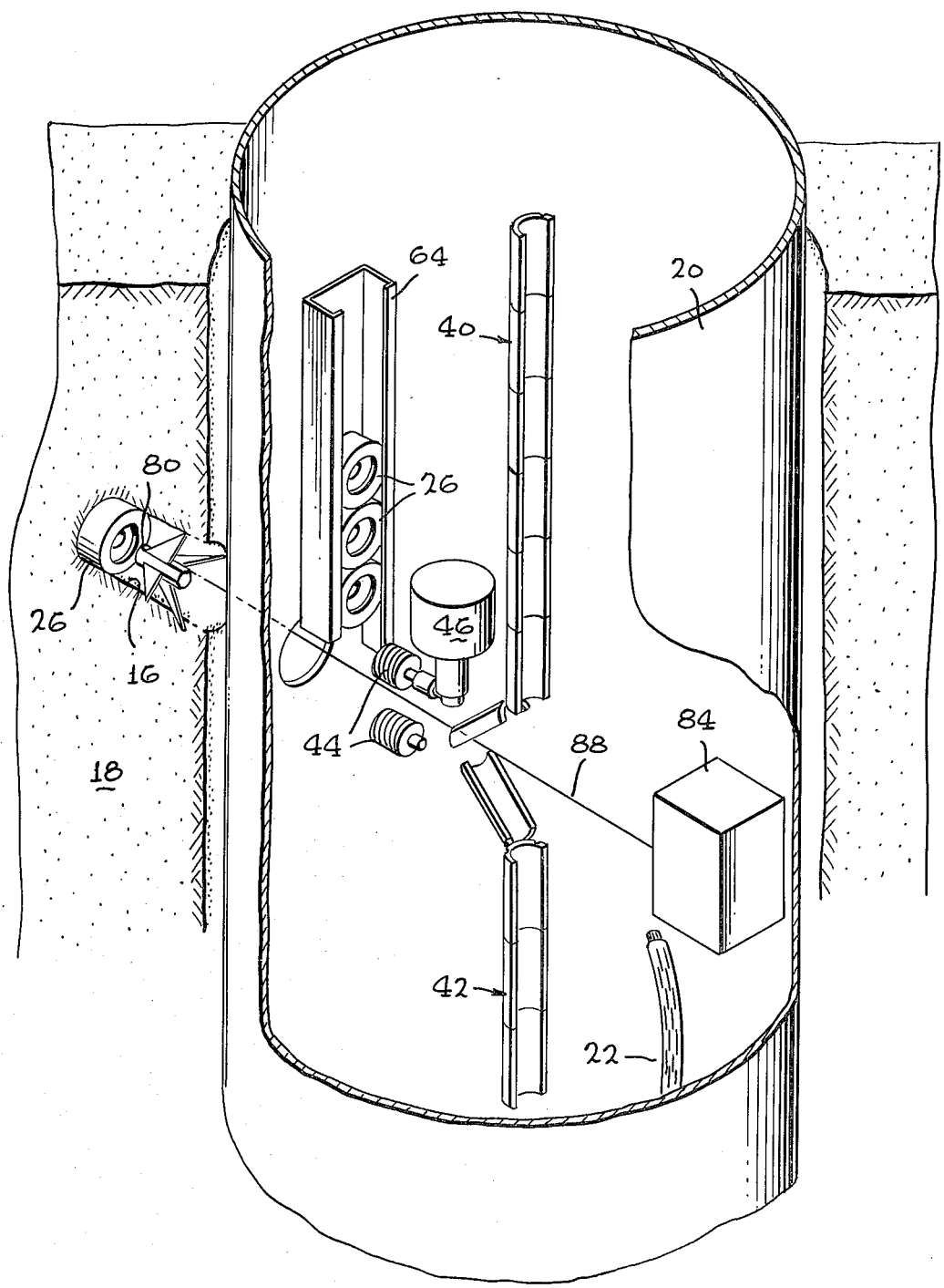
FIG. 9 is a perspective view of the apparatus of FIG. 8, after the completion of a probe inserting operation.

FIG. 9 illustrates the completion of the operation, wherein the trains 40, 42 of sheathing members have been withdrawn from the side hole but the probe 80 has been left in place, and has been triggered to extend a group of anchors that anchor it in place in the side hole 16. The spring steel probe carrier 82 is also been withdrawn and only instrument cables 88 extend from the probe to the probe storage case 84.

The side hole drilling apparatus can be utilized in a variety of ways. Where deep side holes are to be drilled, as to increase the outflow of oil or steam from a formation, no probe has to be utilized. The drill bit 26 can be left in the hole, or can be withdrawn for reuse. Since drill bits have a limited life time, a new drill bit can be applied to the end of the flexible shaft 22 for drilling another hole with the aid of the sheathing structure. Where a large number of venting holes are required, the flexible shaft 22 and sheathing apparatus can be utilized many times, with the boring housing 20 raised to a new location after the drilling of each hole, or the drilling of a set of holes by a set of boring mechanisms contained in a single housing.

The motors such as 30 and 46 can be powered in a variety of ways, such as by an electrical cable extending down the borehole from the winch 14 (FIG. 1) to the housing 20, and connected therefrom by wires to the motors. The apparatus can be controlled by an automatic control in the housing 20 or above the ground that includes sensors for feedback, or can be controlled manually. For example, an operator at the surface can begin the supply of current through a cable extending down the borehole, to all of the motors as soon as the housing has been lowered to the desired depth and the packers 15 inflated (as from a valve connected to a compressed gas cylinder in the housing 20, and with the valve opened by a signal passed through another cable extending down the borehole).

Figure 10:
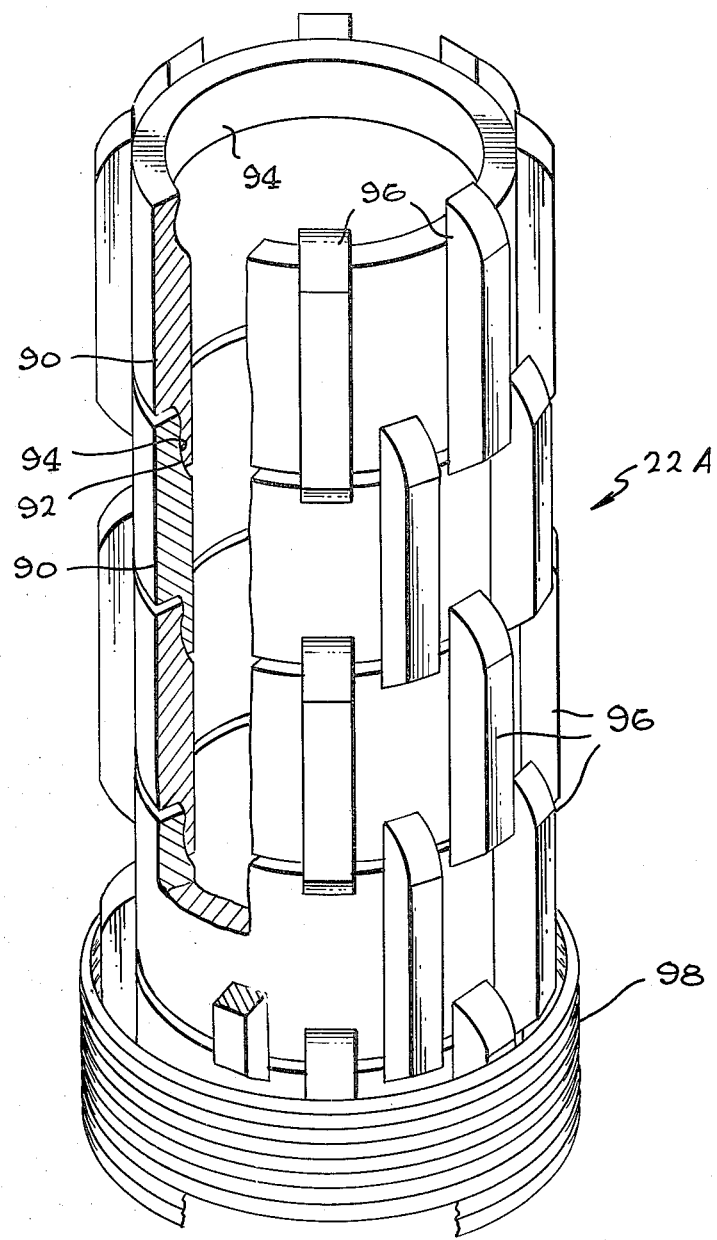
FIG. 10 is a partially perspective sectional view of a flexible hollow drive shaft constructed in accordance with the invention, which is useful for taking side hole core samples.

One useful type of geological assessment requires the taking of a core sample from a side hole. This can be accomplished by utilizing a flexible shaft 22A having the structure illustrated in FIG. 10. The flexible shaft 22A is shown to include a series of hollow segments 90, each having a partial spherical surface or ball 92 at its rearward end which is received in a partial sprocket 94 at the front end of the next segment, to permit flexing of the shaft. The members carry keys 96. A spring wound flexible shield 98 surrounds the series of segments 90 to more securely hold them together. The keys 96 on the series of segments 90, serve to support the shield 98 against collapse while providing a drill fluid supply annulus through which fluid can flow to the drill head. Drill chips can flow rearwardly around the sheathing which is of smaller diameter than the drill bit 26.

One boring system that has been designed, utilizes a drill bit of 1¼" diameter that is utilized at the end of a flexible shaft of 8 feet in length for drilling a long side hole. This apparatus is contained in a housing that can fit down a bore hole of 6" diameter. The housing has a 30 foot length and contains four boring mechanisms that can drill four holes simultaneously that extend at 90° spacings about the axis of the borehole. The apparatus can be utilized to drill four side holes, and then can be lifted several feet to drill another series of side holes, etc., so as to drill a large number of side holes for increasing the flow of oil from strata into the bore hole.

Thus, the invention provides for effectively drilling a long side hole into the strata surrounding a narrow borehole at a location deep within the borehole. This can be accomplished by the use of a sheathing apparatus that includes pairs of sheathing members that can be applied about a boring tool such as a flexible drive shaft, and with the sheathing members being lockable into a substantially rigid structure to assure that a relatively straight hole is bored.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus useful in forming a side hole in a strata from a location within a borehole that extends into the strata comprising:
   boring means which is operable to bore a hole and which includes a flexible elongated portion;
   a first series of sheathing members;
   a second series of sheathing members; and
   means for advancing said boring means and sheathing members into the strata surrounding said borehole while operating said boring means to bore a hole, said means for advancing including means for progressively applying said first and second series of members at opposite sides of said boring means portion while advancing said boring means and sheathing members into the strata surrounding said borehole.

2. The apparatus described in claim 1 wherein:
   said apparatus includes walls forming a housing with an exit hole; and wherein
   said sheathing members are formed to lock to one another; and
   said means for applying includes a pair of guides for guiding said sheathing members in movement towards one another to lock together at a predetermined location, and means for engaging said sheathing members downpath from said location to advance said sheathing members through said exit hole and into the surrounding strata.

3. The apparatus described in claim 1 wherein:
   at least one of said series of members includes rack teeth spaced along said members; and
   said applying means includes a motor and a gear driven by said motor and engaged with said rack teeth to advance said members.

4. A method for forming a side hole from a location along a borehole into the strata surrounding the borehole, comprising:
   advancing a substantially flexible boring tool substantially sidewardly through the borehole side wall and into the surrounding strata; and
   successively applying a series of rigid sheathing sections about said boring tool, substantially rigidly connecting together successive sections to prevent the series of sections from bending to a small radius, and advancing said series of sections into the hole formed by said tool to support said tool against excessive bending as it bores deeply into the strata.

5. The method described in claim 4 wherein: said step of applying a series of sheathing members includes moving a pair of trains of sheathing sections along a pair of curves that intersect along a path that is in alignment with the sidehole to be bored.

* * * * *